March 1, 1932.  A. F. WARD ET AL  1,847,150
DOUGH DIVIDING MACHINE
Filed March 30, 1929  6 Sheets-Sheet 4

INVENTORS
Ashley F. Ward
Paul S. Ward

March 1, 1932.  A. F. WARD ET AL  1,847,150
DOUGH DIVIDING MACHINE
Filed March 30, 1929   6 Sheets-Sheet 5

INVENTORS
Ashley F. Ward
Paul S. Ward
by their attorneys
Burnes Stibbins & Parmelee March 1, 1932.　　　A. F. WARD ET AL　　　1,847,150
DOUGH DIVIDING MACHINE
Filed March 30, 1929　　6 Sheets-Sheet 6

Patented Mar. 1, 1932

1,847,150

UNITED STATES PATENT OFFICE

ASHLEY F. WARD AND PAUL S. WARD, OF CINCINNATI, OHIO, ASSIGNORS TO ASHLEY F. WARD, INC., OF CINCINNATI, OHIO, A CORPORATION OF OHIO

DOUGH DIVIDING MACHINE

Application filed March 30, 1929. Serial No. 351,382.

The present invention relates to dough-dividing machines, and more especially to a power-driven machine for carrying out those steps in the method of making pan biscuit described in the Ward Patent No. 1,144,953, of June 20, 1915, which consists in forming the mass of dough into biscuits in the pan preparatory to baking them, and in addition thereto greasing the dough before dividing it.

As described in said Ward patent, a mass of dough of an amount sufficient to form a pan of biscuit is first rounded up or balled to form a skin on the dough mass. The mass is then placed in a baking pan and compressed to flatten it and spread it over the bottom of the pan. While so held, the dough is cut or divided into biscuits by blunt dividing knives. The pan of biscuits thus formed is then ready to be put into the oven for baking to form a baked loaf of biscuits which can be readily broken apart along the lines of cleavage where the knives pass through the dough.

The machines heretofore used for carrying out such steps in dividing the dough into the biscuit are described in the Ward method Patent No. 1,144,953 and in the Ward machine Patent No. 1,144,952. Such machines have been hand-operated machines in which the pan containing the mass of dough is moved into the machine, the machine then operated by manual power through a lever, and the pan with the divided biscuit withdrawn from the machine.

The machine of the present invention is a power-operated machine so designed that the pans may be pushed in continuously from one side of the machine and withdrawn from the other side of the machine, permitting the pans to be strapped together in sets usually of three pans each. The machine receives the pans in which are placed the masses or batches of dough. The machine first applies grease or oil to the top of the dough and then compresses and divides the dough into the biscuit units, the pans with the biscuits thus formed being delivered from the opposite side of the machine from the side in which the pans with the masses of dough are fed.

The machine is rapid in operation and requires but the services of a man to feed in the pans at one side of the machine and another man to remove them at the opposite side of the machine. The machine operates to grease the dough and divide it into biscuit at the rate of about thirty pans of biscuit per minute.

In the drawings which illustrate the preferred embodiment of the invention.

Figure 1:
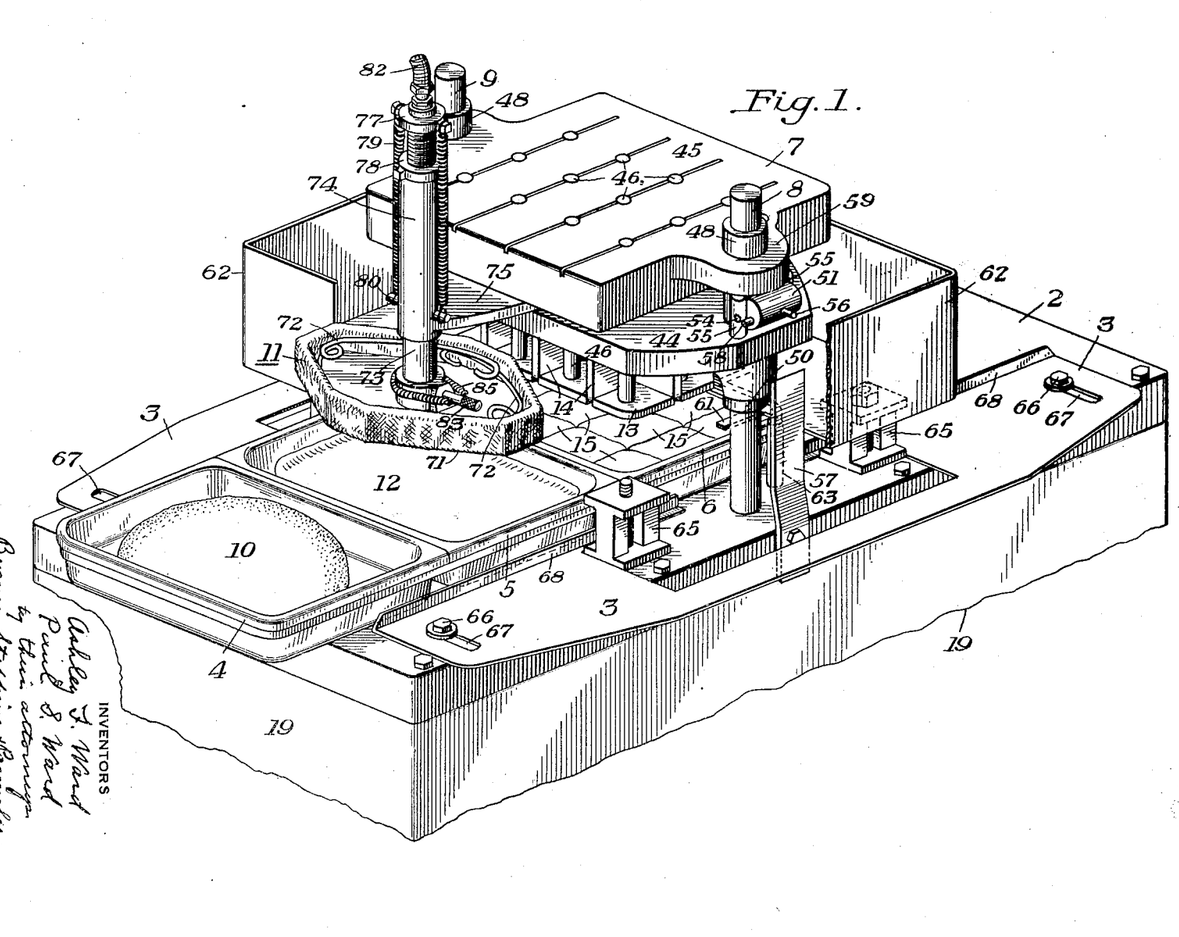
Figure 1 is a perspective view of the head of the machine illustrating its operations upon the dough.

Referring to Figure 1 of the illustrated embodiment of the invention, the machine has a table or bed plate 2, provided with adjustable side guides 3. The pans 4, 5 and 6 therein illustrated are pushed from left to right along the table 2 between the guide plates 3, under the operating head of the machine, which is indicated generally by the reference numeral 7. The head of the machine is carried on reciprocating members which are the plungers or rods 8 and 9 and is moved up and down about thirty times a minute, or as fast as the operators can efficiently feed the pans of dough through the machine.

As shown in Figure 1, the machine head is at the upper limit of its stroke and is shown as having just operated to preliminarily flatten and grease the dough in pan 5 and to have divided the dough in pan 6 into the biscuit. The dough as supplied to the machine is balled up into a rounded batch of dough 10, shown in the pan 4. The pan with the batch of dough is then pushed forward beneath the oiling or greasing device 11, which is carried by the head of the machine and which descends on the downward stroke of the machine head to preliminarily flatten the ball of dough 10 and apply oil to it, the dough in the flattened form 12 covering the greater part of the bottom of the pan 5.

Upon the next upward stroke of the machine, the pan with the flattened greased dough 12 is moved forward beneath the machine head 7, and beneath the presser plates 13 and dough-dividing knives 14. On the next downward stroke, the presser plates 13 first flatten out the dough and distribute it uniformly over the bottom of the pan. The presser plates 13 are then arrested in their downward movement and the cutting knives 14 continue their downward movement, being projected between the presser plates 13, through the dough to the bottom of the pan, dividing the mass of dough into the individual biscuits indicated at 15 in Figure 1. Upon the next upward stroke of the machine head, the pan with the formed biscuit is moved to the right and out of the machine.

As shown in Figure 1, the baking pans in which the biscuit are formed are strapped together in a set of three pans. When the set of pans is moved forward one step beyond that illustrated in Figure 1, so that the last pan 4 is beneath and being operated upon by the greaser 11, another set of pans containing the balled-up masses of dough is pushed in in the front, or left-hand side of the machine as shown in Figure 1, so that the first pan of the new set immediately follows the last pan of the set going through the machine. In this way, a continuous stream of pans is fed through the machine from front to back, or from left to right as shown in Figure 1. The operator at one side of the machine pushes the pans into the machine to position them under the greaser and cutting head, and another operator at the other side of the machine takes away the pans and puts them on suitable trucks to go to the baking oven.

Figure 4:
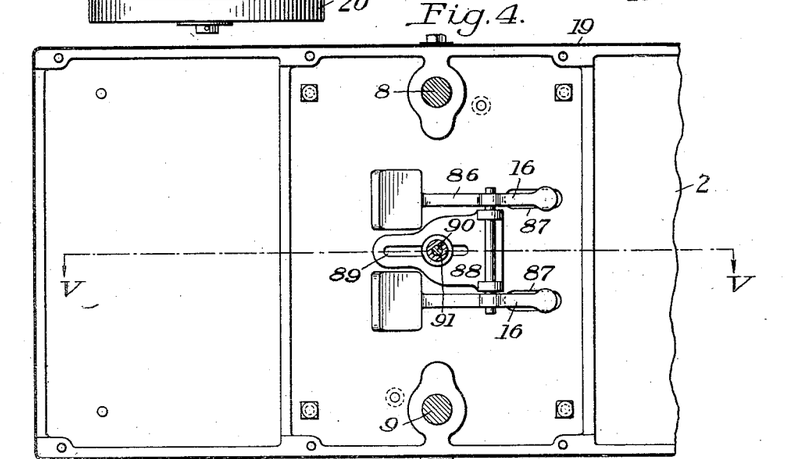
Figure 4 is an inverted horizontal section along the line IV—IV of Figure 2.
Figure 5:
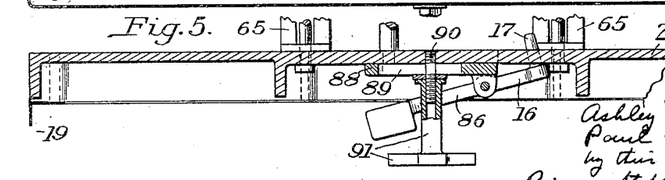
Figure 5 is a vertical section along the line V—V of Figure 4.
Figure 6:
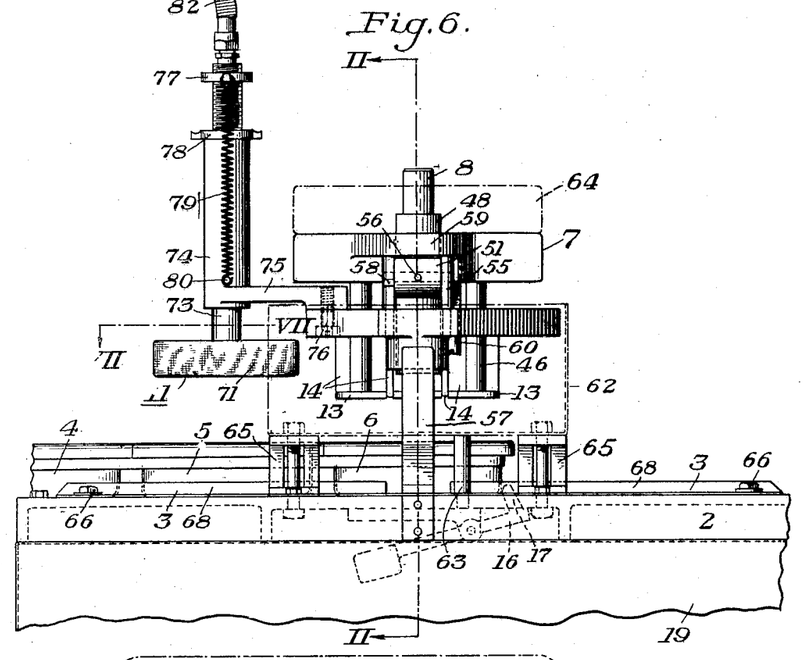
Figure 6 is a side elevation of the head of the machine.

The pans are automatically properly positioned beneath the cutting head and the greaser by means of a yielding latch 16, shown in Figures 4, 5 and 6. This latch has two pins or stops 17, which project through the pan-supporting table in the path of the pans. The operator pushes the pan forward until the forward edge of the pan engages the latch pin 17, which offers sufficient resistance to stop the pan when gently pushed forward. As soon as the cutting head has descended to perform its operations on the dough, the operator shoves the set of pans forward hard enough to push down the latch pins 17, which ride under a pan and which again spring up to arrest the next following pan, and by their resistance indicate to the operator that he has pushed the set of pans the proper distance into the machine for the next operation.

The reciprocating head of the machine is preferably reciprocated up and down continuously at a convenient speed, usually about thirty times a minute, as it is found that an operator can feed the pans forward during the upstroke at such speed to position the pans ready for the machine to operate upon the dough on the next down stroke. The machine so operating will do more work than where the descent of the operating head is controlled by the operator.

Having thus described generally the operation of the head upon the dough, we will now describe in detail the operating mechanism.

The table or base plate 2 is a casting which is supported from the bed plate 18 of the machine by a vertical sheet metal casing 19, which encloses the mechanism for reciprocating the head-carrying rods 8 and 9. The casing has a hinged door 19a. The sheet metal of the supporting casing 19 is relatively thin, preferably about one-thirty-second of an inch thick, so that it forms a somewhat yielding support for the table 2, to allow a slight downward yield of the table under the cutting pressure for the purpose hereinafter referred to. The base plate 18 of the machine is supported on suitable wheels 20, so that the machine may be moved around as desired. It is a portable, self-contained unit which may be readily moved about the shop as desired.

The mechanism for reciprocating the rods 8 and 9 is mounted on the bed plate 18. Such mechanism comprises the electric motor 21, connected through the reducing gearing 22 to a shaft 23. The shaft 23 extends through one side of the casing and carries a hand wheel 24, which may be turned to reciprocate the rods 8 and 9 and is useful in adjusting the machine. The other end of the shaft 23 carries a pinion 25 which meshes with a gear wheel 26, carried by the shaft 27.

Figure 12:
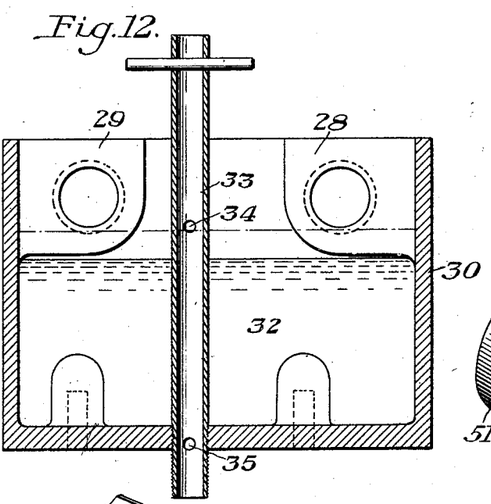
Figure 12 is a detail vertical section of the lubricating oil reservoir in the base of the machine.

The shafts 23 and 27 have their bearings 28 and 29 formed in the upper part of the oil reservoir casting 30. These shafts are lubricated by chains 31, which are carried over the shafts and dip into the oil bath 32 in the oil reservoir. A vertical pipe 33 extends through the oil reservoir, being threaded through its bottom. The pipe 33 has two holes 34 and 35 formed therein. The hole 34 serves as an upper oil level limit. The oil from the reservoir may be drained out by screwing up the pipe 33 until the hole 35 is exposed in the bottom of the reservoir to allow the oil to drain out through it.

The gear wheel 26 serves as a crank arm for a connecting rod 36, which is connected to the cross head or bar 37, extending between the vertical reciprocating rods 8 and 9. The lower end of the connecting rod 36 has a bearing around the lubricated pin 38, carried by the wheel 26. The bearing between the upper end of the connecting rod 36 and the cross bar 37 is formed by an eccentric sleeve 39, which may be adjustably turned around the cross bar 37 and locked in position by the set screw 40. The outer surface of the sleeve 39 forms the journal for the connecting bearing with the connecting rod 36.

As shown in the drawings, the sleeve 39 is eccentric, that is, the outer cylindrical bearing surface is eccentric to the inner bore of the sleeve, so that by adjusting the sleeve 39 on the cross bar 37, the vertical position of the cross bar 37 and reciprocating rods 8 and 9 may be adjusted, whereby the position of the cutting knives at the downward limit of their stroke with relation to the table of the machine and bottom of the bread pans may be adjusted. The bearing at the upper end of the connecting rod is lubricated by an oil reservoir 41, carried by the upper end of the connecting rod.

The vertical rods 8 and 9 have sliding bearings 42 and 43, through the table 2 and bed plate 18, respectively. The operating head of the machine is carried by the upper ends of the rods 8 and 9. As can readily be seen, the rods 8 and 9 are given a vertical reciprocatory motion of a throw equal to the effective diameter of the crank formed by the pin 38 of the crank wheel 26.

Figures 15, 16:
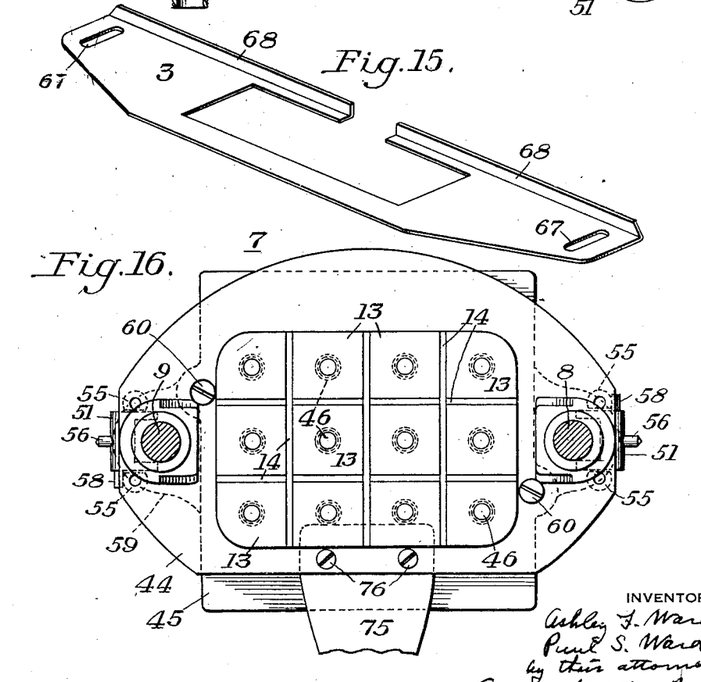
Figure 15 is a perspective view of one of the side guide plates.
Figure 16 is an inverted plan view of a portion of the head of the machine.

The reciprocating head of the machine, which is designated generally by the reference numeral 7, is shown in side elevation in Figure 6 and in section in Figures 2, 9, 10 and 11. This operating head has two plates 44 and 45 made of castings. The lower plate 44, for convenience designated as the knife-carrying or cutter plate, carries the blunt-edged dough-cutting or dividing knives 14, which are forced through the dough upon the downward movement of the operating head, to divide the dough into the individual biscuit units. The upper plate 45, for convenience designated as the plunger plate, carries a number of plungers 46, which extend through openings 47 in the knife plate 44. The lower ends of the plungers 46 carry plates 13, which form compressor plates or heads for flattening out the dough in the pan to a uniform thickness over the bottom of the pan, preparatory to the division of the dough by the cutter knives 14. An inverted bottom plane view showing the compressor plates 13 and cutting knives 14 is shown in Figure 16. As there shown, the compressor plates 13 form a compressor plate which fills the entire area of the pan, the compressor plate being interrupted only where the cutting knives 14 operate through it.

The cutter head or plate 44 is supported by the reciprocating rods 8 and 9, and is arranged to be drawn downwardly by power by the rods 8 and 9 to cut the dough, provision being made for releasing the connection between the cutter head 44 and the rods 8 and 9 in case of improper positioning of the pan beneath the dough-dividing knives. Two bronze sleeves or bushings 48 are rigidly secured to the cutter head casting 44 by pins 49. These bushings 48 have a sliding fit on the rods 8 and 9. The lower ends of the bushings 48 rest on collars 50, secured by pins 50a to the rods 8 and 9 to support the weight of the cutter head 44 and the other parts supported by it.

Figure 14:
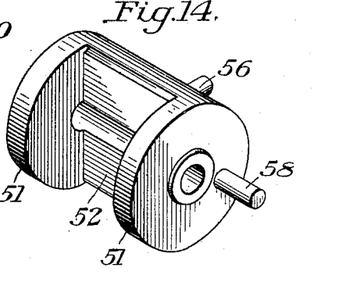
Figure 14 is a perspective view of the locking dog.

The cutter head 44 is, during the normal operation of the machine, locked to the rods 8 and 9 as they approach the bottom limit of their stroke, so that the cutting knives may be forced by the power of the motor through the dough to divide it. Provision, however, is made to render such locking means inoperative in case of mal-position of a pan in the machine so as to prevent damage to the pan. Such controllable locking of the cutter head 44 to the rods 8 and 9 is had by means of the latches or dogs 51, which are shown in detail in Figures 14 and 15 (see Figures 1, 2, 9, 10 and 11 for the assembly of such dogs in the machine). The dogs 51 consist of short cylindrical pieces which are cut away on one side at 52. The sides of the rods 8 and 9 have semi-cylindrical recesses 53, for the engagement of the dogs 51. The dogs 51 are supported on short shafts 54, which are carried by the posts or pins 55, projecting upwardly from the cutter head 44. The outer or cylindrical faces of the dogs 51 have projecting pins 56, which are arranged to be engaged by the stops 57, which extend up from the table 2.

Figure 13:
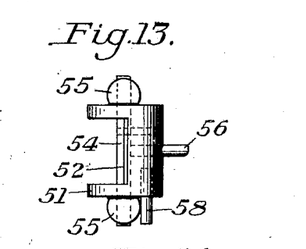
Figure 13 is a plan view of the locking dog in the head of the machine.

The operation of this latching or locking mechanism is as follows: When the rods 8 and 9 and the machine head 7 carried thereby are in their upper position, the latches 51 assume the position shown in Figure 2. The weight of the solid or outer portion of the latches 51, together with the weight of the pins 56, turns the latches so that the flat face of the cutaway portion 52 is vertical. A stop pin 58 (Figures 1, 13 and 14) engages one of the vertical posts 55, to hold the latch 51 in this position. As the rods 8 and 9 move downwardly, the cutter head 44 moves downwardly with the rods by gravity, being supported by the collars 50. This downward movement continues until the parts have assumed the position shown in Figure 11, where the pins 56 are in a position to be engaged by the stops 57. If the pan is properly centered between the presser plates and the cutting knives, the presser plates and cutting knives are free to enter the pan. The cutter head 44 is therefore free to move downwardly from the position shown in Figure 11 to that shown in Figure 9. During such downward movement, the pins 58 engage the stops 57 and the dogs 52 are turned to the position shown in Figure 9 and into locking engagement with the semicylindrical recesses 53 in the rods 8 and 9. The cutter head 44 continues to descend by gravity, resting upon the supporting collars 50 on the rods 8 and 9, until the resistance of the dough to the blunt-edged knives is sufficient to counter-balance the weight of the cutter head 44, and thereafter the cutter head is drawn downwardly by the power-driven downward movement of the rods 8 and 9 applied to the cutter head through the locking dogs 51.

Figures 9, 10, 11:
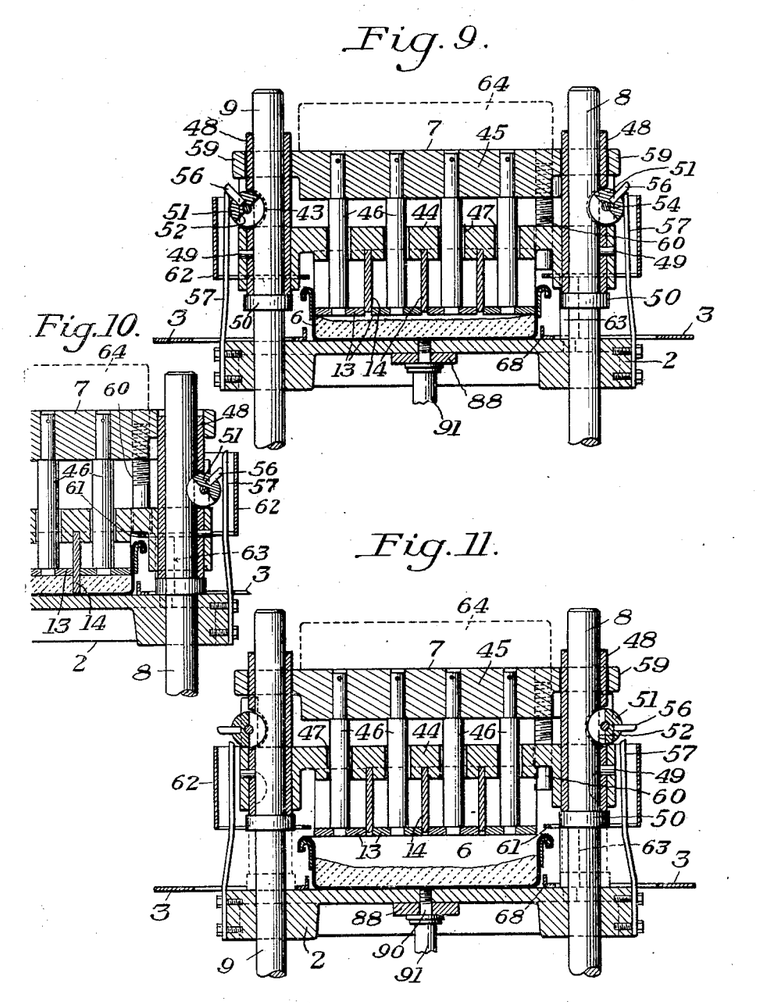
Figures 9, 10 and 11 are vertical sections through the head of the machine along the line II—II of Figure 6, illustrating the compressing plungers and cutting knives in different positions.

The final position of the cutter head at the end of the stroke, where the cutting knives 14 are pressed into firm engagement with the bottom of the pan, is indicated in Figure 10.

Figure 2:
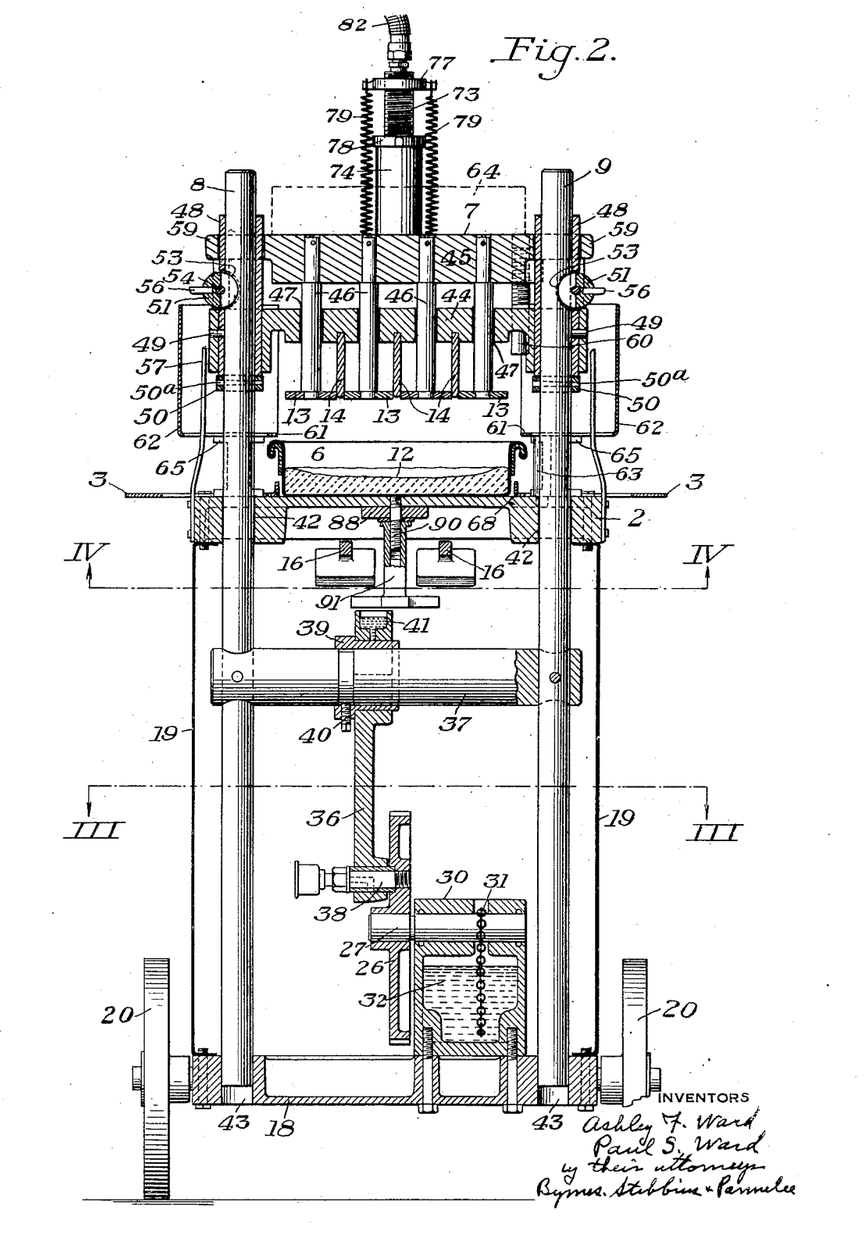
Figure 2 is a vertical section through the machine along the line II—II of Figure 6.
Figure 3:
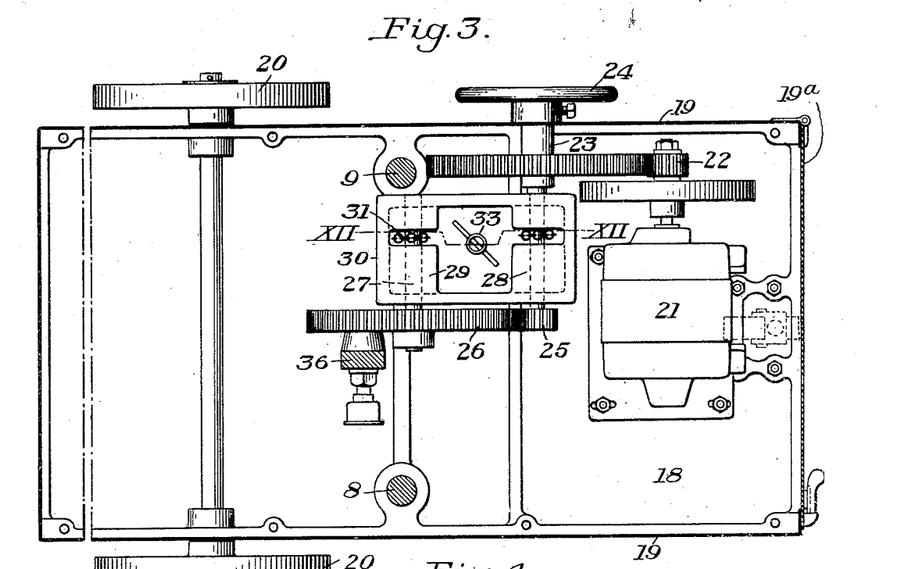
Figure 3 is a horizontal section along the line III—III of Figure 2.

After the knives have made the cut, the rods 8 and 9 begin their upward movement, the parts assuming the position shown in Figures 9, 11 and 2, in sequence, the dogs being released from their locking engagement with the rods 8 and 9 during the upper part of the stroke. The frictional engagement with the dogs 51 of the upper ends of the stops 57, as well as the overweight of the pins 56 and solid portions of the dogs 51, insures the turning of the dogs from the position shown in Figure 9 to that shown in Figure 11. If, for any reason, such as the improper position of the pan beneath the cutting knives 14, one of the cutting knives 14 should engage the edge of the pan, the dogs 51 are not thrown into locking engagement with the rods 8 and 9, and the cutter plate is not forcibly drawn down. The cutter head 44 descends with the arrestable pressure afforded by gravity until it reaches the position shown in Figure 11. If a pan is improperly positioned beneath the cutter head, one of the knives 14 will engage the edge of the pan and the cutter head can therefore not descend further by gravity, but will be arrested and held in the position shown in Figure 11, in which the latches 51 are unlocked. The rods 8 and 9 are therefore free to move downwardly and do not carry with them the cutter head 44. In this way, damage to the pans because of carelessness of the workmen in improperly positioning a pan beneath the cutter is avoided.

The plunger presser or head 45 is loosely mounted on top of the cutter head 44, being positioned by the plungers 46, which have a sliding fit through the cutter head or plate 44, and by the outwardly extending lugs 59 on the ends of the presser head 45, which have a sliding fit around the upper ends of the sleeves 48. The presser head 45 is supported, except at the extreme downward stroke, by the posts 55 which carry the latches 52 and which contact with the under sides of the lugs 59. As the rods 8 and 9 descend, carrying the cutter head 44 with them, the plunger head 45 moves downwardly under gravity, to bring the presser plates 13 into engagement with the top of the dough in the pan in order to flatten out the dough over the bottom of the pan into a layer of uniform thickness.

The initial engagement of the presser plates 13 with the dough is illustrated in Figure 9. The dough is thus flattened out by the weight of the plunger head 45 and its associated parts, as shown in Figure 10. The extreme downward movement of the presser head 45 under gravity is arrested by the adjustable posts or pins 60, which are adjustably threaded in the plunger head 45 and which contact with the horizontal portion 61 of the guard plate 62, as shown in Figure 10. The posts 60 therefore serve as limits to the downward movement of the presser head 45 and the presser plates 13, in order to prevent an undue compression of the dough after the presser plates 13 have flattened it out and uniformly distributed it over the bottom of the pan. The horizontal portion 61 of the guard plate 62 is supported at the places where the pins 60 contact with it by the supporting posts 63, which extend up from the table 2.

The weight of the presser head 45 and its associated parts will be ordinarily sufficient to apply the requisite pressure to flatten out the mass of dough to a uniform thickness over the bottom of the pan. However, if additional weight is required, the weight or weights 64 (indicated in dotted lines in Figures 2, 6, 9, 10 and 11) may be placed upon the top of the plunger head 45.

The operator is shielded against injury from the descending cutting head by means of the sheet metal shield or guard 62 which surrounds these parts, see Figures 1 and 2. This shield is supported by posts 65, extending up from the table 2. The horizontal portions 61 of the shield 62 project over the edges of the pans and serve as strippers to prevent the pans from following the cutting knives 14 and presser plates 44 in their upward movement in case they bind in the pan.

The pans are guided through the machine by the guide plates 3, which are adjustably mounted on the table by means of the bolts 66, carried by the table 2 and the slots 67 in the guide plates 3. The inner edges of the guide plates 3 have upstanding flanges 68, which form the side guides for the pans as they are shoved over the table 2. One of the side plates 3 is shown in perspective in Figure 15.

Figure 7:
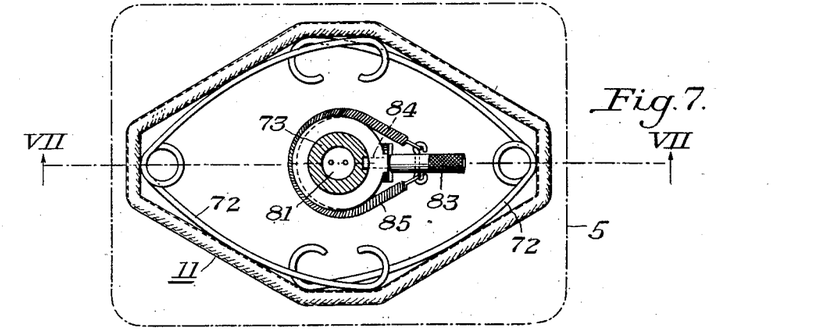
Figure 7 is a horizontal section along the line VII—VII of Figure 6.
Figure 8:
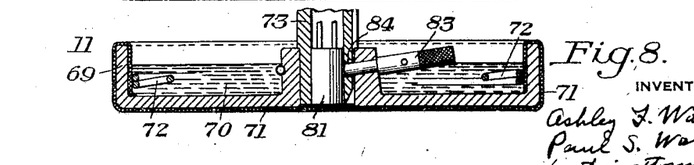
Figure 8 is a vertical section along the line VIII—VIII of Figure 7.

The oiling or greasing mechanism which applies an oil or grease to the rounded ball of dough is indicated generally by reference numeral 11. The greasing mechanism comprises a pan 69, which is arranged to be filled with a suitable oil or grease 70. This pan is provided with a fabric covering 71 which extends over the outside bottom of the pan. The edges of the fabric are brought over the edges of the pan and down into the oil bath so that the fabric is wet with the oil by capillary attraction. The fabric is held in position by the fabric-holding springs 72 (Figures 1, 7 and 8).

The oiler 69 is carried on the lower end of a plunger 73 (Figure 1), which is slidably mounted in a sleeve 74, supported by a plate 75, secured to the front edge of the cutter head 44 by means of bolts 76 (Figures 1 and 6). The upper end of the plunger 73 is screw-threaded and carries two collars 77 and 78.

Tension springs 79 are connected between collar 77 and pins 80 on the sleeve 74 and serve to urge the plunger 73 downwardly with yielding pressure. The adjustable collar 78 serves as a limiting stop to the downward movement of the plunger 73 through the sleeve 74. When the rods 8 and 9 and the cutter head 44 move downwardly, the greaser 69 is moved down and into engagement with the balled-up batch of dough in the pan beneath it. The greaser engages the dough with the yielding pressure afforded by the springs 79 preliminarily flattening the dough and applying a thin film of oil or grease to its upper surface. The greaser 11 by flattening the dough insures an even distribution of the oil over the upper surface of the dough as it is spread out in the pan. When the rods 8 and 9 rise, the greaser is lifted out of contact with the dough.

In order to keep the oil or grease 70 in the pan 69 in a liquid condition, the lower end of the plunger 72 is provided with an electric heater 81, supplied with current through the flexible electric connection 82.

The grease pan 69 is made removable so that when the machine is shut down for the night, it may be taken off and placed in a refrigerator to keep the oil or grease from becoming rancid. For this purpose, a spring-pressed locking pin 83 is provided which engages a recess 84 in the side of the plunger. The pin 83 may be pulled out against the tension of its retaining spring 85, and the pan removed for storage or cleaning.

The pans which are shoved across the table by the operator are automatically and properly positioned beneath the cutting head and oiling device by means of the latch 16, before referred to. This latch is shown in detail in Figures 6, 4 and 5. This latch 16 consists of a weighted lever 86, carrying the stop pins 17, which project upwardly through the holes 87 in the table 2 in the paths of the pans. The levers 86 are carried by a plate 88, having a slot 89 through which extends a threaded supporting pin 90, having a clamping nut 91, by means of which the plate can be clamped in adjusted position, thus adjusting the position of the pins 17 in the path of the pans.

When the operator starts the first set of pans through the machine, he positions the first pan by eye beneath the oiler 69. Since the oiler 69 does not make a tight fit in the pan, accurate positioning at this point is not necessary, and moreover, if the oiler should contact with the edge of the pan, the springs 79 will relieve any damaging pressure.

After the ball of dough in the first pan is oiled, the set of pans is then moved forward to the next position, as shown in Figures 1 and 6, in which the forward edge of the first pan engages the stop pins 17 which arrest the movement of the pan. The cutting head then descends to form the biscuit in this pan and the oiler descends to oil the ball of dough in the second pan. When the operating head of the machine rises, the operator shoves the pans forward, the stop pins 17 being pressed downwardly to allow the first pan to slide over them. The stop pins rise as soon as the first pan has passed over them and arrest the forward edge of the second pan so as to position it beneath the cutter head. The set of pans at this position will be advanced one stage beyond the position of the set of pans shown in Figure 1.

The operator then enters a second set of pans into the machine, the forward pan of the second set pushing against the last pan of the first set to move the last pan of the first set against the stop pins 17 and the first pan of the second set beneath the oiler 11. The operator by thus continually supplying and pushing fresh sets of pans into the machine, pushes the set of pans which is being operated upon through the machine where the pans are removed by another worker. While for convenience of handling, it is preferred to strap the pans together in sets of three, as is shown in the baking tray, the pans could be used singly, since successive pans will push the forward pans ahead and position them against the stop pins 17.

The operation of the machine may be summarized as follows:

The electric motor 21 is put into operation and the plungers or rods 8 and 9 are continuously reciprocated at the desired speed to move the operating head of the machine up and down. The operator then enters a set of pans at the front of the machine, each pan containing a ball or batch of dough. He positions the first pan with the balled-up batch of dough beneath the greaser 11, which, upon the next downward stroke of the machine head, descends and applies a thin film of grease to the top of the dough and preliminarily flattens it in the pan.

By oiling the skin at the top of the ball of dough, before dividing the dough by the cutting knives, it is found that a better separation of the biscuit in the baked loaf is secured. The blunt cutting knives carry the oiled upper surface or skin of the dough downwardly as they pass through the dough, as described in the Ward method Patent No. 1,144,953. The oil thus carried down by the cutting knives increases the ease with which the individual biscuit may be broken apart along the cleavage planes formed by the passage of the knives through the dough, as described in said Ward Patent.

Upon the next upward movement of the machine head, the greaser 11 is raised, releasing the pan. While the machine head is raised, the operator quickly pushes the pans forward until the pan containing the greased dough engages the stop pins 17, which arrest it and position it beneath the presser plates 13 and the dividing knives 14. The downward reciprocation of the rods 8 and 9 then lowers the machine head and causes the presser plates and dividing knives to enter the pan. The presser plates 13, urged downwardly by gravity, press and flatten out the dough uniformly over the bottom of the pan. The presser plates 13 and the presser head 45 are then arrested either by the resistance of the dough or by the contact of the stop pins 60. The cutter head 44, however, continues to descend, first by gravity and then by the positive downward pull of the rods 8 and 9, exerted through the latches 51, until the blunt-edged knives 5 are brought in contact with the bottom of the pan.

As described in the Ward method Patent No. 1,144,953, these blunt dividers serve to draw down the upper skin of the batch of dough and pinch it off against the bottom skin at the bottom of the pan, thus dividing the mass of dough into individual biscuit.

The throw of the crank 36 and the reciprocating plungers or rods 8 and 9 is so adjusted that the blunt-edged cutting knives are forced down against the bottom of the pan, and at the extreme downward part of their movement push down the table 2 very slightly, the table 2 having a slight downward yield because of the flexibility of the sheet metal casing 19. This allows the blunt-edged cutting knives to remain in contact with the bottom of the pan, where they are pinching off the dough, during a short arc of movement of the crank pin 38 at the downward part of its stroke, thus giving time for the dough to ooze out sidewise beneath the blunt-edged cutting knives. The adjustment of the stroke of the cutting knives so that the table is moved down slightly with a yielding movement gives, in effect, a time dwell to the knives while they are pinching off the dough at the bottom of the pan. The yielding downward movement of the table 2 compensates for and renders unnecessary the exact adjustment of the downward position of the cutting knives which would be necessary if the table 2 were rigidly supported from the base. As can be readily seen, if the table 2 were rigidly supported from the base, very accurate adjustment of the lowermost position of the cutting knives would be necessary, because if such lowermost position were adjusted too far down, the machine would be broken, or if adjusted too far up, the dough would not be completely pinched off. Because of the yielding mounting of the table 2, the knives can be adjusted to come into positive contact with the bottoms of the biscuit, and then to have a slight additional movement which does not have to be gauged with extreme accuracy.

After the cutting stroke is thus completed and the dough is divided, the head of the machine rises, releasing a set of pans which is then shoved along further through the machine by the operator. The stops 17 yield under the push of the pans by the operator to allow the pans to be moved along the stops, however, rising to arrest the following pan in position beneath the pressure plates and dividing knives.

As can be readily seen, the operator has to adjust by his eye only the first pan of the first set of pans which is being fed through the machine. After this set of pans is moved through the machine so that the last pan of the set is beneath the oiling or greasing device 11, the operator takes another set of pans and enters it in the machine, using this set of pans to push the set of pans already in the machine along the table 2. When a pan is arrested by the stop pin 17 beneath the pressure plates and dividing knives, the next following pan is, of course, thereby automatically positioned beneath the greasing device 11.

One operator thus feeds a continuous succession of pans in at the front of the machine. The machine automatically arrests the pans in the proper operating position, first applies oil to the upper surface of the dough, and thereafter upon the next reciprocation of the head, divides this dough into the biscuit. The pans with the biscuit thus divided move out from the back of the machine, from which they are taken by the operator and put upon trucks or conveyors to be taken to the baking ovens.

In case the operator should improperly position a pan beneath the cutting head of the machine, the pan will not be damaged. As before explained, during the first part of the downward movement of the reciprocating rods 8 and 9, the cutter head descends by gravity and the latches 51 do not connect the cutting head with the rods until after the cutting knives have entered the pan. The downward movement of the cutting knives under gravity is, of course, yielding and arrestable so that if the pan is improperly positioned, the downward movement of the knives will be arrested by contact of the knives with the edge of the pan, whereupon further descent of the cutting head is checked and the rods 8 and 9 move idly downward. Upon the upward movement of the rods, the head of the machine is lifted and the operator can then properly position the pan.

While the invention has been specifically illustrated and described with special reference to its preferred embodiment in a machine for making pan biscuit in accordance with the Ward method Patent No. 1,144,953, the invention is not so limited, but may be otherwise embodied in dough-dividing machines within the scope of the following claims.

We claim:

1. A dough-dividing machine comprising a support for a pan of dough to be divided, a movable head carrying a dough-distributing plate and a dough-dividing knife, both adapted to enter the pan of dough and distribute it in the pan and then divide it, power-driven means for reciprocating the head comprising a continuously reciprocating member, and latching means for connecting the head with said reciprocating member rendered inoperative in case the pan is improperly positioned beneath the operating head.

2. A dough-dividing machine comprising a support for a pan of dough to be divided, a movable head carrying dough-dividing knives adapted to be forced through the dough in the pan to divide it, said head also carrying gravity-operated dough-distributing means brought into engagement with the dough in the pan by the downward movement of the head, means for forcing the dough-dividing knives through the dough, and means for rendering such means inoperative to force down the dividing knives in case the dividing knives engage the edge of the pan instead of properly entering it.

3. A dough-dividing machine comprising a support for a pan of dough to be divided, a cutter head having dough-dividing knives adapted to enter the pan and divide the dough, a presser head having dough-distributing plates adapted to enter the pan and distribute the dough preparatory to its division, said presser head being supported from the cutter head and adapted to move downwardly freely under gravity when the cutter head is moved downwardly, a continuously reciprocating power driven plunger, and latching means for connecting the cutter head with the plunger, said latching means being released during the upper part of the plunger stroke but serving to lock the cutter head to the plunger during the lower part of its stroke and after the dough-dividing knives have entered the pan, said latching means remaining inoperative in case the dough-dividing knives are arrested by contact with the edge of the pan.

4. A dough-dividing machine comprising a cutter head having knives adapted to enter a pan of dough to be divided, a reciprocating power-driven member adapted to raise the cutter head and to allow it to descend until the knives enter the pan and thereafter to draw it forcibly downward to carry the knives through the dough to divide it, and means for releasing the cutter head from such power-driven member in case the normal descent of the knives into the pan is arrested by mal-positioning of the pan.

5. A dough-dividing machine comprising a cutter head having dough-dividing knives adapted to enter a pan of dough to be divided, a greasing device carried by the cutter head and adapted to enter the pan and grease the dough preliminary to the cutting operation, a presser head carried by the cutter head and having dough-distributing means adapted to enter the pan to distribute the dough therein preparatory to dividing it, and power-driven means for imparting an up and down reciprocating movement to the cutter head.

6. A dough-dividing machine comprising a table for supporting a pan of dough to be divided and having means for guiding the pan across the table, a reciprocating head over the table having means for distributing the dough in the pan and dividing it, and means comprising a stop movable into and out of the path of the pan and engaging the pan as it is pushed across the table to properly position it beneath the reciprocating head.

7. A dough-dividing machine comprising a table for supporting a pan of dough to be divided and having means for guiding the pan across the table, a reciprocating head over the table having means for distributing the dough in the pan and dividing it, and means carried by the head adapted to enter the pan and grease the dough before the pan is moved beneath the distributing and dividing means.

8. A dough-dividing machine comprising a table for supporting a pan of dough to be divided and having means for guiding the pan across the table, a reciprocating head mounted above the table and comprising a cutter head having dough-dividing knives adapted to enter the pan to divide the dough therein and a presser head having presser plates adapted to enter the pan with the dividing knives to distribute the dough in the pan preparatory to dividing it, said presser head being supported by the cutter head and being adapted to move downwardly upon the descent of the cutter head, power-driven reciprocating plungers, means for connecting the cutter head to the plungers to impart an upward and downward reciprocating motion thereto including latching means rendered inoperative in case the downward movement of the knives is arrested by engagement with the edge of the pan to thereby prevent the cutting knives from being forcibly drawn down and damaging the pan, a greasing device yieldingly mounted on the cutter head and adapted to enter the pan and grease the dough preparatory to the operation of the distributing and cutting means thereon, and a yielding latch interposed in the path of the pan over the table for engaging the pan and positioning it beneath the cutting and distributing means, said latch yielding upon the pan being pushed forcibly against it, whereby the operator can feed the pans continuously across the table.

9. A dough-dividing machine comprising a support for a pan of dough to be divided, a reciprocating head for the machine having knives adapted to enter the pan and divide the dough therein, and distributing plates between the knives for spreading the dough in the pan preparatory to dividing it, said head also carrying a device for applying grease to the surface of the dough preparatory to dividing it.

10. A dough-dividing machine comprising a support for a pan of dough to be divided, means for greasing and distributing the dough in the pan, means for dividing the greased and distributed dough, and power-driven means for actuating the greasing, distributing and dividing means.

11. A dough-dividing machine comprising a table for supporting the dough to be divided, a base, a dough-dividing means having a knife adapted to be drawn downwardly toward the table by means of mechanism mounted on the base, and a yielding structure supporting the table from the base and allowing the table to yield under the pressure of the dividing knife.

12. A dough-dividing machine comprising a base, a table for supporting the dough to be divided, a reciprocating head movable over the table having a dough-dividing knife arranged to be drawn forcibly downward against the table by mechanism mounted on the base, and a flexible sheet metal casing between the table and base surrounding the operating mechanism on the base and serving to permit yielding relative movement of the table toward the base.

13. A dough-dividing machine comprising a reciprocating head having dough-dividing knives and presser plates adapted to enter a pan of dough to be divided, and a stripper extending over the edge of the pan to retain it against upward movement when the dough-dividing knives and presser plates are withdrawn from the pan.

14. A dough-dividing machine comprising a reciprocating head having a dough-dividing means adapted to enter a pan of dough and divide the dough therein, a table having a runway for guiding the pans across it beneath the reciprocating head, and means on the table for arresting the movement of the pans and probably positioning them beneath the dividing means.

15. A dough-dividing machine comprising a reciprocating head having a dough-dividing means adapted to enter a pan of dough and divide the dough therein, a table having means for guiding the pan beneath the reciprocating head, and means on the table comprising a yielding stop positioned in the path of the pan and arranged to yieldingly arrest the pan and position it beneath the dividing mechanism.

16. A dough-dividing machine comprising a table for supporting a pan of dough to be divided, a head reciprocably mounted above the table and having a cutter head provided with knives for entering the pan and a presser head provided with presser plates for entering the pan, and a shield surrounding the cutter and presser heads and having an extension serving as a stripper to engage the pan.

17. A dough-dividing machine provided with means for dividing a batch of dough and means for greasing the batch of dough preliminary to dividing it comprising a pan for holding a liquid grease and an absorbent sheet of material beneath the pan and extending over the pan into the grease therein so as to be saturated by capillary attraction.

18. A dough-dividing machine comprising means for holding a batch of dough to be divided, a dough-dividing knife, and means for bringing the dough-dividing knife into contact with the dough with an arrestable pressure and for thereafter forcibly pressing the knife through the dough to divide it.

19. A dough-dividing machine comprising means for supporting a batch of dough to be divided, yieldable means for compressing the dough, dough-dividing means adapted to be preliminarily moved with the compressing means into contact with the dough with an arrestable pressure, and means for thereafter forcibly pressing the dough-dividing means through the dough to sever it, said means being rendered inoperative in case the preliminary arrestable movement of the dough-dividing means is checked.

20. A dough-dividing machine comprising a table, means for guiding a pan of dough across the table, a movable head over the table having means for greasing the surface of the dough in one position of the pan and having means for dividing the dough in another position of the pan.

21. The method of dividing a batch of dough, which comprises flattening the batch of dough and greasing its flattened surface, and then cutting the dough into portions while held in a flattened position.

22. The method of making pan biscuit which comprises balling up a batch of dough and forming a skin thereon, flattening the balled-up batch of dough and applying grease to its flattened surface, passing knives through the dough to divide it into biscuit, the knives serving to carry the grease into their cleavage cuts through the dough, and baking the loaf of biscuit, the greased cleavage cuts where the knives pass through the dough persisting as planes of separation in the baked loaf of biscuit.

23. A dough-dividing machine comprising means for supporting a batch of dough to be divided, means for preliminarily flattening and greasing the batch of dough, means for thereafter compressing and holding the batch of dough flattened, and means for dividing the thus-greased and flattened batch of dough.

In testimony whereof we have hereunto set our hands.

ASHLEY F. WARD.
PAUL S. WARD.